United States Patent [19]

Brown

[11] 4,013,199
[45] Mar. 22, 1977

[54] MEASURING DISPENSER

[75] Inventor: Richard N. Brown, Macungie, Pa.

[73] Assignee: General Electric Company, Bridgeport, Conn.

[22] Filed: July 28, 1975

[21] Appl. No.: 599,410

[52] U.S. Cl. .............................................. 222/438
[51] Int. Cl.² ...................................... G01F 11/34
[58] Field of Search .......... 222/456, 303, 113, 297, 222/186, 367, 231, 233, 243, 234, 304, 306, 298–300, 307, 308, 438–440, 293; 99/286, 296; 221/7, 8

[56] References Cited

UNITED STATES PATENTS

| | | | |
|---|---|---|---|
| 262,881 | 8/1882 | Wysong | 222/304 |
| 393,149 | 11/1888 | Gates | 221/8 X |
| 995,812 | 6/1911 | Stevens | 222/41 |
| 1,225,107 | 5/1917 | Bullis | 222/293 |
| 1,563,756 | 12/1925 | Liberman | 222/306 X |
| 1,876,332 | 9/1932 | Mabey | 222/113 |
| 2,116,300 | 5/1938 | Campos | 141/369 |
| 2,176,222 | 10/1939 | McGowan | 221/107 |
| 2,584,726 | 2/1952 | McOmber | 222/306 |
| 3,327,615 | 6/1967 | Swan | 99/286 |
| 3,823,844 | 7/1974 | Linkemer | 221/7 X |

Primary Examiner—Stanley H. Tollberg
Assistant Examiner—N. L. Stack, Jr.
Attorney, Agent, or Firm—Leonard J. Platt; George R. Powers; John F. Cullen

[57] ABSTRACT

A measuring dispenser wherein a generally cylindrical drum having a transverse wall is positioned at the bottom of a canister, and a longitudinally movable partition with a transverse wall is inserted within the drum so that variable volume measuring chambers are provided by longitudinally moving the partition within the cylindrical drum.

15 Claims, 5 Drawing Figures

MEASURING DISPENSER

BACKGROUND OF THE INVENTION

1. Field of the Invention

This invention relates to a measuring dispenser and, more particularly, to a ground coffee dispenser which is provided with a variable volume rotatable measuring and dispensing chamber.

2. Description of the Prior Art

Dispensers of the type which may be used for dispensing measured amounts of coffee or other dry ingredients have included a canister with a rotatable dispenser positioned at a bottom opening of the canister. Such dispensing constructions have usually included a generally cylindrical drum along with a partition which is positioned within the drum for varying the size of the measuring chambers. Some of the prior art partitions include a wall which extends radially within the cylindrical drum so that the volume of the measuring chamber may be adjusted by varying the distance of the movable radial wall from a fixed radial wall. Other dispensers include a partition which is longitudinally movable within the drum for varying the size of the measuring chambers. With either arrangement, it is especially desirable that the partitions be readily formed so that they may be economically manufactured. It is also very desirable to provide a partition that may be reliably operated over a long period of time without becoming clogged and without breaking. One particular problem which has been encountered with most dry measuring devices occurs when the ingredients being measured become trapped between the movable portions of the partition and the drum.

Accordingly, it is a primary object of my invention to provide an improved measuring dispenser which is uniquely constructed so that the size of the measuring chambers may be readily varied and the dispenser may be reliably operated over and over again.

It is a further object of my invention to provide a measuring dispenser having relatively few parts which may be readily manufactured at relatively low cost.

SUMMARY OF THE INVENTION

In accordance with one of the aspects of this invention, my improved measuring dispenser includes a canister having a bottom wall, and a generally cylindrical dispensing drum is supported for rotational movement on the canister by curved guides that are positioned at the bottom wall of the canister. The dispensing drum has an enlarged dispensing aperture that is formed in its cylindrical wall for cooperating with an enlarged opening that is provided in the bottom wall of the canister for dispensing a measured quantity of material. Dispensing chambers are provided between the cylindrical wall of the drum, a longitudinally fixed transverse wall that is integrally formed with the drum, and an adjustable transverse partition that is movable toward and away from the longitudinally fixed transverse wall to vary the volume of the dispensing chambers that are provided in the drum. The movable partition includes a generally longitudinal member having a width slightly less than the inside diameter of the cylindrical drum and a transverse partition wall integrally formed at one end of the longitudinal plate. The transverse partition wall is arranged generally perpendicular to the longitudinal member and has a diameter slightly less than the inside diameter of the drum. The partition is inserted within the drum with the longitudinal member extending through a transverse slot that is formed in the transverse wall of the drum. A partition adjuster mechanism is provided for moving the transverse partition wall toward and away from the transverse wall of the dispensing drum in order to vary the volume of the measuring chambers that are provided between the transverse walls.

With this unique construction, the size of the measuring chambers within the drum may be varied by simply moving the transverse partition wall within the drum. During such movement, the longitudinal plate portion of the partition will be moved to a greater or lesser extend through the slot in the transverse wall of the dispensing drum.

Moreover, the dispenser may be readily positioned within a coffee canister and reliably operated over and over again. This is achieved because the partition itself includes only a longitudinal member which is integrally formed with a circular end disc. One end of the plate is simply inserted within a longitudinal slot in an end wall of a drum and there are really no substantial cylindrical surfaces which slide or rotate within each other. Thus, ground coffee cannot become trapped between two relatively movable cylindrical surfaces.

In addition, with my construction arrangement, many of the parts may be integrally formed with each other so that the dispenser may be economically manufactured and reliably constructed. For example, the cylindrical drum including its end wall with the diametrical slot and the enlarged apertures in its cylindrical wall may be readily formed in one molding operation. In a similar manner, the partition including its longitudinal plate and disc may also be integrally formed in a molding operation. It can be appreciated that with this construction there is no need to provide tabs for connecting one or more of the parts to each other after they have been partially asembled to each other. Accordingly, long life and reliability have been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
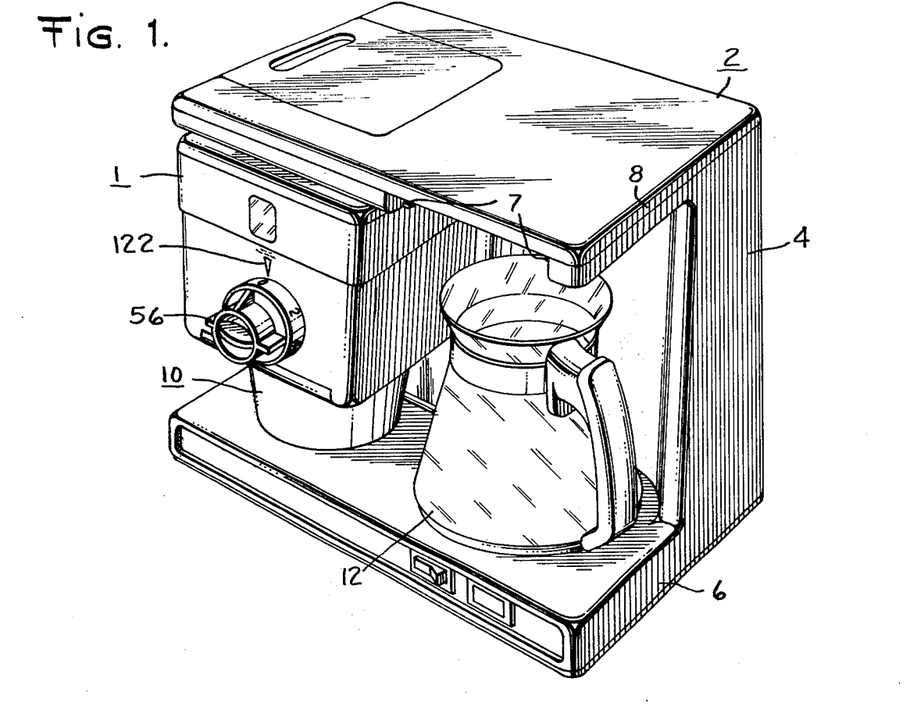
FIG. 1 is a front perspective view of an electric coffeemaker which includes a dispenser constructed in accordance with my invention.

Referring now to the drawing and first particularly to FIG. 1, there is shown an electric drip coffeemaker which includes a preferred embodiment of my unique dispenser 1 for measuring and dispensing a quantity of dry ground coffee so that a desired brew strength is achieved by the electric coffeemaker. As shown, the coffeemaker includes a housing 2 having a generally vertical hollow rear wall 4, a hollow stand portion 6, and an overhanging wall 8. My improved ground coffee dispenser 1 is positioned at the left of the coffeemaker beneath the overhanging wall 8, nd it may be operated to dispense dry ground coffee into a coffee basket 10. After the basket 10 has been filled with a desired amount of coffee, it may be slid outwardly from the dispenser and positioned on a support 7 that is provided in the overhanging wall 8. A carafe 12 is suitably supported on the stand 6 of the coffeemaker for receiving the brewed coffee from the coffee basket 10.

The overall construction of the electric coffeemaker including the housing 2, the carafe 12, the coffee basket 10 and the arrangement for supporting the coffee basket 10 on the dispenser 1 and the overhanging wall 8 of the coffeemaker do not form a part of this invention and are described and illustrated in greater detail in my co-pending application, Ser. No. 599,411, now U.S. Pat. No. 3,968,740 issued July 13, 1976, assigned to the same assignee as the present invention.

MEASURING DISPENSER

In accordance with a preferred embodiment of this invention, my improved infinitely variable measuring dispenser may be constructed for measuring and dispensing just the right amount of ground coffee for brewing two, four, six, eight or ten cups of coffee, and thus it includes a counting ring 16 for indicating a quantity of ground coffee for brewing two, four, six, eight or ten cups of coffee. However, it should be understood that the dispenser could be used for dispensing other materials or ingredients such as sugar, flour or peanuts, for example, in other specific quantities.

Figure 2:
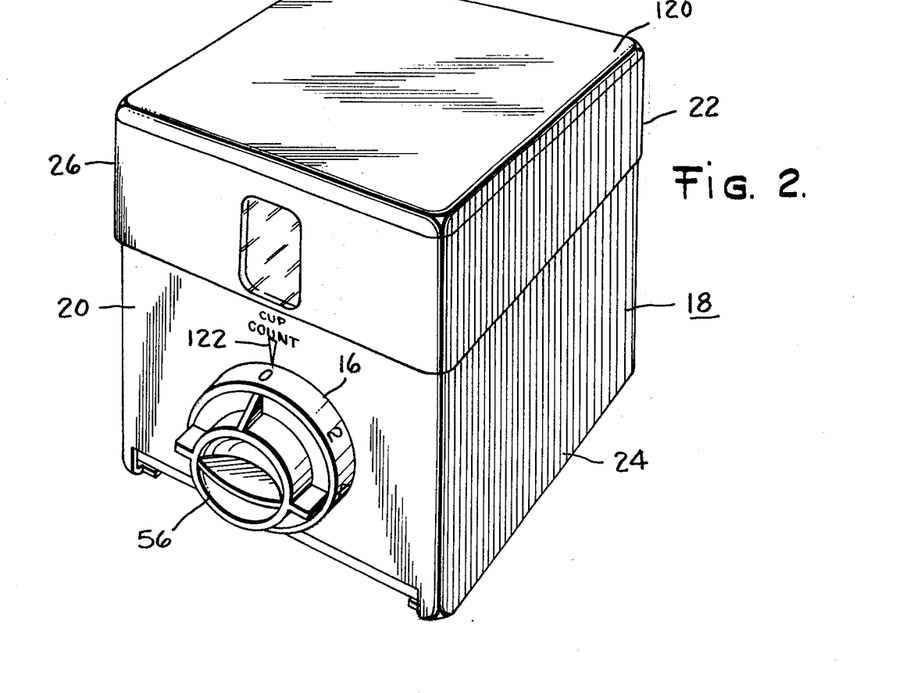
FIG. 2 is an enlarged front perspective view of the dispenser illustrated in FIG. 1.
Figure 3:
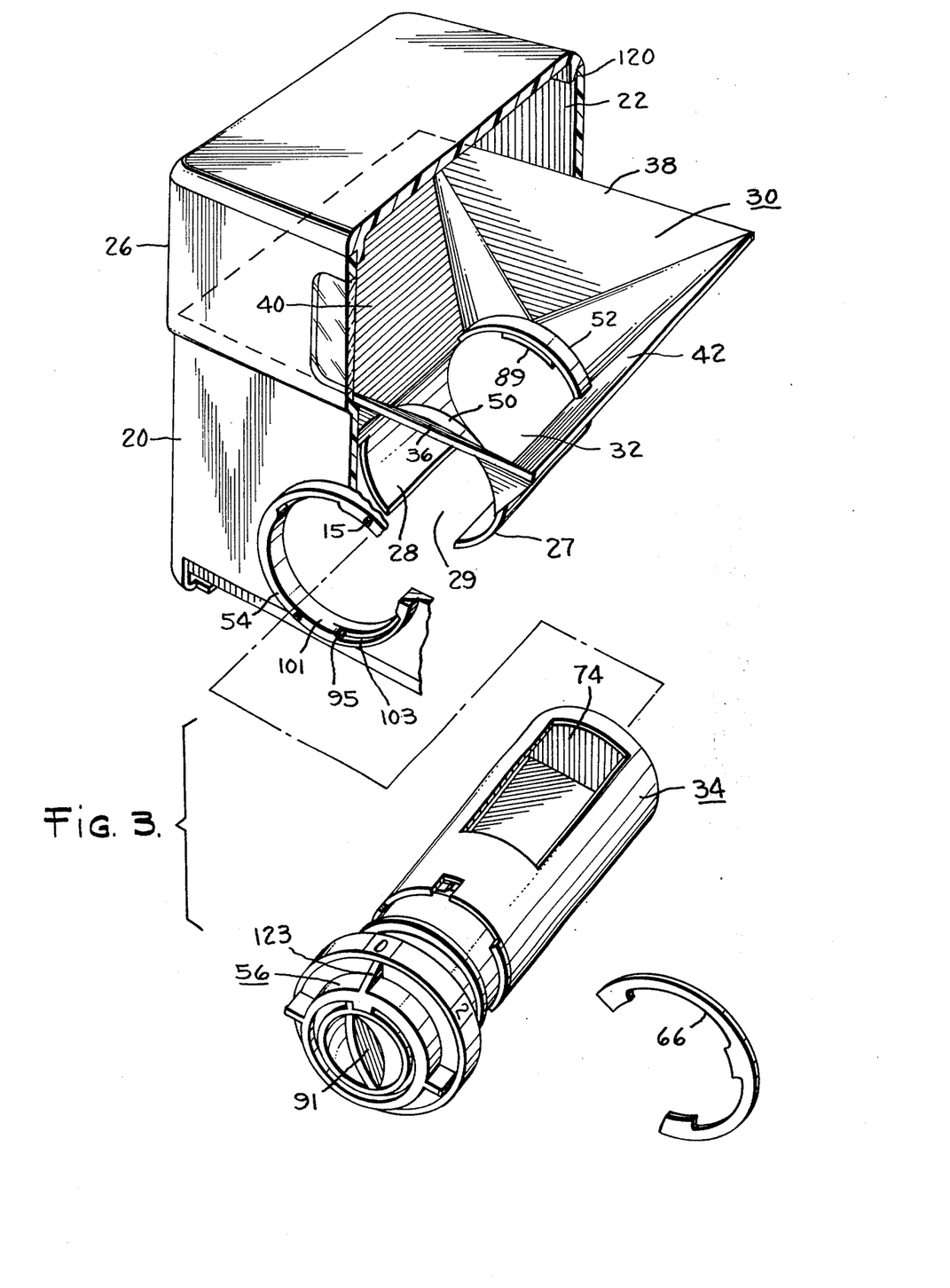
FIG. 3 is a perspective view of the dispenser shown in FIG. 2 with parts cut away for purposes of illustration.

With particular reference to FIGS. 2 and 3, it can be seen that the dispenser includes a canister 18 for holding ground coffee or other material. The canister has a front wall 20, a rear wall 22, side walls 24 and 26, and a sloped bottom wall 30 for guiding the ground coffee toward an enlarged aperture 32 that is provided adjacent to a dispensing drum 34. The sloped bottom wall includes a plurality of planar-shaped segments 36, 38, 40 and 42 which are inclined downwardly toward the enlarged opening 32. However, it is to be understood that the walls may be inclined in the form of a truncated cone or some other shape.

As shown in FIG. 3, the canister also includes a generally curved shaped segment front guide 50, a rear guide 52 and a knob guide 54. Two curved guide walls 27 and 28 extend between the front and rear guide segments 50 and 52, the opening 32 which is formed in the inclined bottom wall 30, and a discharge opening 29 that is provided at the bottom of the guide rings 50 and 52. It can be seen that the front and rear guides 50 and 52 are positioned at the bottom wall 30 at the front and rear of the enlarged opening 32, and the circular guides 50 and 52 are arranged in line with each other so that they may readily receive the cylindrical drum 34.

As shown in FIG. 3, the circular knob guide ring 54 is formed or provided in the front wall 20 of the canister for holding and guiding a generally cylindrical dispenser knob 56 for rotating drum 34.

DISPENSING DRUM

Figure 4:
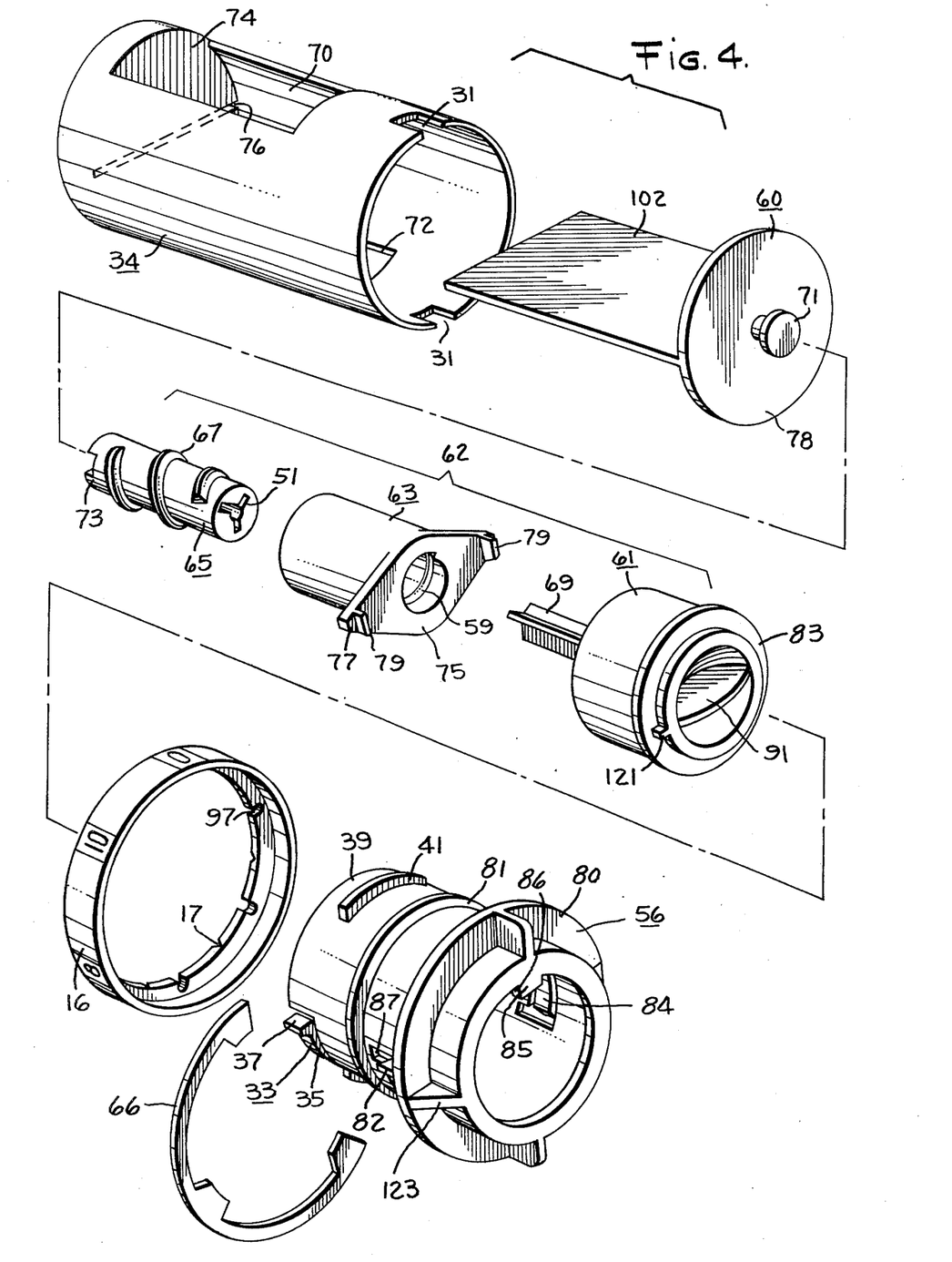
FIG. 4 is an exploded perspective view of the dispensing drum, variable partition, adjuster, counting ring, and locking ring of the dispenser shown in FIG. 2.
Figure 5:
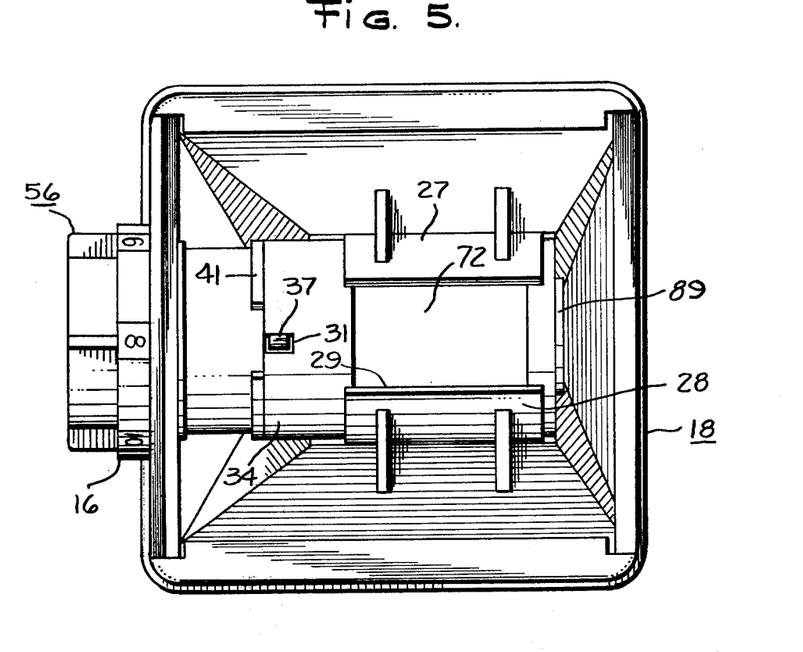
FIG. 5 is a bottom plan view of the dispenser shown in FIG. 2.

As shown more particularly in FIG. 4, my unique dispensing drum 34 is shaped and constructed so that it may perform a plurality of functions in its cooperation with a movable partition 60, a partition and brew adjuster 61, 65 and 63, and the enlarged aperture 32 which is formed in the bottom wall of the canister. The drum 34 is generally cylindrical in shape and it may be readily inserted through the cylindrical knob guide ring 54 and the curved front and rear supporting guides 50 and 52, respectively. It includes two enlarged apertures 70 and 72 in its side cylindrical wall that are approximately equal to the aperture 32 which is provided in the bottom wall of the canister and approximately equal to the discharge opening 29 that is provided at the bottom of the curved side walls 27 and 28 for delivering a measured quantity of ground coffee or other material when either the aperture 70 or the aperture 72 is rotated in line with the aperture 29 that is provided by the generally cylindrical guide walls 27 and 28 and the guide rings 50 and 52.

The drum 34 is provided with a transverse wall 74 having a diametrical slot 76 formed therein for cooperation with the partition 60 including its transverse wall 78 and longitudinal plate 102 to provide variable dispensing chambers in a manner to be more particularly described hereinafter.

The generally cylindrical dispenser knob 56 which is provided for rotating the drum 34 in order to dispense a measured quantity of ground coffee includes an integrally formed flange 80 for cooperating with the knob guide 54 of the canister, the cup counting ring 16 and a locking ring 66 to permit the knob 56 to be held in a longitudinally fixed position while it is being rotated in order to rotate the dispensing drum 34 within its circular front guide 50 and rear guide 52. With particular reference to FIGS. 3 and 4, the generally cylindrical knob 56 also includes a cylindrical flange 81 and, after the cylindrical knob 56 has been placed in its assembled position within the canister, the locking ring 66 is simply snapped over the cylindrical knob between its flange 81 and the inside wall of knob guide 54 to hold the cup counting ring 16 sandwiched between the flange 80 of the cylindrical knob 56 and the front wall of the canister and to hold the cylindrical knob in a generally longitudinally fixed position while it is rotated in order to rotate the dispensing drum.

In accordance with my invention, a pawl and slot connection is provided between the cylindrical knob 56 and the drum 34 in order to permit the drum to be rotated in a clockwise direction by to prevent the drum from being rotated counterclockwise. To achieve this, a plurality of slots 31 are provided in the dispensing drum 34 for cooperation with a plurality of pawls 33 that may be integrally formed with the generally cylindrical knob 56. As shown in FIG. 4, each of the pawls includes a curved arm portion 35 which is integrally held at one of its ends to the cylindrical body of the knob 56 and is provided with a generally radial lug 37 or insertion within any one of the plurality of slots 31. The diameter of the rear end portion of the generally cylindrical knob is somewhat smaller than the diameter of the cylindrical dispensing drum 34 and thus, when the knob is positioned for rotating the drum, its rear end portion 39 will be inserted within the drum until the sectional flanges 41 that are provided on the knob are moved into contact with the front surface of the dispensing drum 34. In this position, the pawls 33 and particularly their radially extending lugs 37 will ride on the inside surface of the cylindrical drum when the knob is rotated in a counterclockwise direction without causing any rotational movement of the dispensing drum. However, when the knob 56 is rotated in a clockwise direction, the radial lugs 37 will snap into the slots 31 that are provided in the drum to cause the drum 34 to be rotated along with the knob 56 to dispense two half chambers full of coffee for each revolution of the knob 56.

The dispenser knob 56 is also formed to include a plurality of integral pawl fingers 82 and 84 for cooperating with internal notches 97 that are provided on the counting ring 16 in order to count the measures of dry ground coffee or other material which is being dispensed by the measuring dispenser in a manner to be more particularly described hereinafter.

VARIABLE MEASURING PARTITION

With particular reference to FIG. 4, it can be appreciated that the variable measuring partition 60 has been uniquely designed with the dispensing drum 34 for achieving a reliable variable dispenser having relatively few parts. The partition itself may be integrally molded of a suitable thermoplastic material to include a transverse wall 78 and a generally rectangular plate 102 for dividing the cavity within the drum 34 into two dispensing chambers. As shown, the generally rectangular longitudinal plate 102 of the partition has a width which is slightly less than the inside diameter of the drum 34, and the transverse wall 78 of the partition has a diameter which is slightly less than the inside diameter of the drum 34. Also, the transverse partition wall 78 is arranged generally perpendicular to the longitudinal plate 102.

In accordance with my invention, a rotatable adjuster 62 is uniquely incorporated with the partition and the drum for moving the partition forwardly and rearwardly within the drum. As shown in the mid-portion of FIG. 4, the rotatable adjuster mechanism 62 includes an adapter member 63 having internal screw threads 59, an adjuster member 65 having screw threads 67 formed on its outer periphery for cooperating with the screw threads 59 of the adapter, and a brew knob 61 which is provided with a fluted key 69 for rotating the adjuster member 65 within the adapter 63 for moving the adapter inwardly or outwardly in order to adjust the relative longitudinal position of the transverse partition disc 78 with respect to the transverse wall 74 of the drum.

As shown in FIG. 4, the transverse wall 78 of the partition is provided with a flanged coupling button 71 for coupling the partition 60 to the inward end of the adjuster member 65. To complete the coupling, the inner end portion of the adjuster member is provided with a plurality of longitudinally and radially inwardly directed fingers 73, one of which is directed radially inward for coupling the adjuster member to the flanged button 71. To connect the parts, the radially inwardly directed finger is hooked over the flanged button 71 and the parts aligned. The other longitudinal fingers on the member 65 prevent separation. The radially inwardly directed portions of the fingers 73 cooperate with the inside surface of the button to enable the adjuster member to pull the button 71 and the partition 60 forwardly when the member is rotated in one direction within the adapter. Naturally, when the adapter member is rotated in the other direction, the outside surface of the button 71 will be moved inwardly by the axial surface of the adjuster member 65 which is located between the spring fingers 73.

A readily formed mechanism is provided for holding the adapter member 63 in a generally longitudinally fixed position within the dispenser knob 56 so that rotation of the adjuster member 65 will cause the adjuster member to move longitudinally to and fro within the adapter member 63 to vary the longitudinal position of the partition 60 within the dispensing drum 34. To achieve this, the forward portion of the adapter member 63 is provided with outwardly extending arms 75 having radially extending lugs 77 for insertion within holding slots 87 that extend through the cylindrical wall of the dispenser knob 56. Axially extending lugs 79 are provided adjacent to the outwardly extending lugs 77 for cooperation with the inside cylindrical surface of the dispenser knob 56 to hold the adapter generally centered within the dispenser knob 56.

In the preferred embodiment illustrated in the mid-portion of FIG. 4, it can be appreciated that the adjuster member 65 is provided with three longitudinally extending radial slots 81 for cooperating with the three flutes 69 that are provided on the brew adjusting knob 61. This coupling allows axial movement of the member 65 while providing positive rotational drive.

The brew adjusting knob 61 is provided with an outwardly extending flange 83 for cooperating with a radially inwardly extending tab 85 that is formed at the front of the dispenser knob 56 for holding the brew knob axially within the dispenser knob 56.

A stop lug 121 may be integrally formed with the brew knob 61 for cooperating with a stop lug 86 on knob 56 to provide a suitable rotational stop for the adjuster 65.

In order to assemble the parts to each other, the adjuster member 65 is inserted within the adapter 63 by simply aligning the rear end portion of the adjuster member 65 with the adapter 63 and rotating the adjuster member 65 in a clockwise direction to engage the external screw threads 67 of the adjuster member with the internal screw threads 59 of the adapter 63. Then the fluted end portion 69 of the brew knob 61 is inserted within the radial slots 51 of the adjuster 65. The adjuster mechanism subassembly 62 is then inserted within the dispenser knob 56 by first placing the brew knob 61 within the rear end of the dispenser knob 56 and pushing the entire subassembly forwardly until the outwardly extending flange 83 of the brew knob is moved into engagement with the radially inwardly extended tab 85 of the dispenser knob. During this movement, the outwardly extending lugs 77 of the adapter member 63 should be positioned within the slots 87 that are formed in the cylindrical knob 56, and naturally, the axial lugs 79 of the adapter member 63 will hold the adapter and the adjuster mechanism in a generally central position within the dispenser knob 56. Then, the counting ring 16 is placed over the dispenser knob 56 with its outwardly extending surface in engagement with the inside surface of the flange 80 of knob 56. In order to assemble the partition 60 to the dispensing drum 34 and the adjuster mechanism 62, it is merely necessary to insert the partition 60 within the drum 34 until the longitudinal plate 102 is inserted through the diametrical slot 76 in the transverse wall 74 of the dispenser drum 34. A finger 73 of the adjuster member 65 is then hooked over the button 71 to connect the adjuster mechanism 62 to the partition 60. This mechanism also acts as a universal joint allowing substantial misalignment between the dispenser partition adjuster assembly and the drum assembly.

The entire subassembly may then be inserted within the canister. It can be appreciated that the dispenser drum 34 will be first threaded through the knob guide ring 54 and then through the circular front guide 50 and rear guide 52 until the longitudinally rearmost portion of the drum 34 is moved into engagement with a radially inwardly extending flange 89 that is provided on the rear guide 52. The entire assembly is locked into longitudinal position by then simply placing the snap ring 66 over the cylindrical knob 56 between its flange 81 and the longitudinal inside surface of the knob guide 54.

In a preferred embodiment of my invention, it is desired that my improved infinitely variable measuring dispenser be constructed for measuring and dispensing just the right amount of dry ground coffee for brewing two, four, six, eight or ten cups of coffee. It can be appreciated that the dispenser drum includes only two variable measuring chambers that are positioned on opposite sides of the longitudinal plate 102 and the overall size of the chambers has been determined so that each chamber holds approximately three tablespoons of coffee, which is the amount of coffee normally required for making two cups of coffee. The partition 60 may be moved to and fro within the dispensing drum by simply gripping a tab 91 that is formed on the brew knob 61 for rotating the adjuster member 65 in the screw threaded adapter to move the transverse partition 78 with respect to the longitudinally fixed partition 74. With this construction, it can be appreciated that the approximate three tablespoon size of each of the measuring chambers can be accurately varied from approximately 3-¼ standard tablespoonfuls to approximately 2-½ standard tablespoonfuls. In this manner, the brew setting of the variable dispenser for determining the strength of the brew could remain set so that day after day just the right amount of dry coffee would be dispensed according to the taste preference of the person making the coffee.

This construction is exemplary of a preferred embodiment of my invention and it should be understood that the longitudinal member 102 could be shaped to provide three, four, or more chambers. Moreover, the chambers could be constructed to be larger or smaller depending on the intended use of my invention.

In accordance with my invention, a unique mechanism is provided for counting the number of two-cup volumes that are dispensed with each half rotation of the dispensing drum 34. This is achieved by the cup counting ring 16 and its cooperation with its driving spring fingers 82 and 84 and a unique cam surface 95 that is formed on the inner circumferential surface of the knob guide ring 54. The counting ring has six indicia for indicating 0, 2, 4, 6, 8 or 10 cups of coffee, and it can be appreciated that the dispenser drum 34 is rotated one-half revolution for dispensing one chamberful of a quantity of dry coffee for making two cups of coffee. Thus, the counting ring 16 is designed to be rotated one-sixth of a rotation for each half rotation of the dispensing drum. Two diametrical driving fingers 82 and 84 are provided on the dispenser knob for selectively engaging the six notches 97 that are provided on the inside surface of the counting ring. Since it is desired to rotate the counting ring one-sixth of a rotation for each half revolution of the dispenser and its dispenser knob 56, the cam surfaces 95 that are provided on the inside of the knob guide ring 54 have been designed to hold the driving fingers 82 and 84 out of engagement with the notches 97 during approximately two-thirds of each half rotation of the dispenser knob 56. Thus, as shown more particularly in FIG. 3, the cam surface 95 includes two radially inwardly directed raised cam surfaces 101 that extend approximately 120° and two oppositely disposed outer cam surfaces 103 that extend for approximately 60°. Thus, during the first 60° rotation of each dispensing movement of the dispenser knob 56, the spring fingers 82 and 84 will be held on the radially inwardly directed cam surfaces 101 and will be prevented from moving outwardly far enough to engage any of the notches 97. However, during the last 60° of each 180 degree dispenser knob rotation, the spring fingers 82 and 84 will move from the radial inner surface 101 to the radial outer surface 103 and in that position each of the spring fingers 82 and 84 will move into the next notch 97 to rotate the counting ring one-sixth of a rotation. Then, the spring fingers 82 and 84 are cammed radially inward by the camming surfaces 101 to disengage the counting ring 16 from knob 56. Thus, for example, the counting ring would be moved from its 4-cup indicator until the 2-cup indicator appears opposite the marker 122. To further prevent continued rotation of the counting ring 16 through frictional engagement with the dispenser knob, spaced spherical or similarly shaped projections 15 on the face of the knob guide ring 54 may be provided for engagement with notches 17 which may be provided in the rear face of the counting ring 16.

OPERATION

The dispenser may be readily operated by simply inserting a quantity of ground coffee or other material through a top opening 120 of the canister and then adjusting the dispenser to dispense the desired quantity of coffee or other material. First, it may be desired to adjust the volume of the dispensing chambers that are provided between the transverse walls 78 and 74 and, in order to achieve this, the grip tab 91 is rotated within the knob 56 to select and set the quantity that it is desired to dispense during each half rotation of the dispensing knob. Then the counting ring 16 may be rotated with respect to the dispenser knob 56 in either direction in order to set the desired number of dispensing increments or index the ring 16 to zero. With pawls 82 and 84 disengaged from the notches 97 of the cup counting ring 16, the cup counting ring 16 is free to rotate in either direction. When the pawls 82 and 84 are in engagement with the notches 97, counterclockwise rotation of the cup counting ring 16 will cause the knob 56 to rotate with the counting ring until the pawls 82 and 84 are disengaged by the cam surfaces 101 of the knob guide ring 54. In addition, as the knob 56 rotates in a counterclockwise direction, the pawls 33 disengage the drum 34 and, thus, and undesired uncounted dump of dry ground coffee is prevented.

If, for example, it is desired to dispense a quantity of ground coffee for making six cups of coffee, the counting ring is rotated until the numeral 6 appears directly below a vertical indicator line 122 that may be provided on the front wall 20 of the canister. Then the knob 56 is grasped and rotated in a clockwise direction to rotate the dispensing drum 34 and its partition 60. When the drum is rotated one increment so that the opposite indicator tab 123 on the dispenser knob and the numeral 4 appear below the line 122, one of the enlarged openings 70 and 72 will be placed in line with the enlarged opening 29 that is provided at the bottom of the dispenser and the quantity of ground coffee within one of the chambers will be dispensed into the coffee basket 10 that may be positioned below the dispenser. Continued rotation of the dispensing drum in a clockwise direction will cause the empty chamber and particularly its enlarged opening 70 or 72 to be moved in line with the enlarged opening 32 that is provided at the bottom wall of the canister and the dispenser chamber will be refilled with ground coffee. While one of the chambers is being refilled, the chamber on the other side of the dispenser will be discharging ground coffee through opening 29 and into the coffee basket as the counting ring moves from its 4 position to its 2-cup position. Continued rotation of the knob 56 in a clockwise direction until the numeral 0 appears immediately below the indicator 122 will result in dispensing three chambers full of ground coffee which has been accurately measured to produce six cups of brewed coffee.

From the foregoing discussion, it will be appreciated that my improved measuring dispenser may be readily formed with relatively few parts. The principal components comprise a uniquely formed dispenser drum 34 which includes integrally provided dispensing openings 70 and 72, a slotted transverse wall 74 and slots 31 which enable it to be coupled to the spring fingers 33 of its driving knob 56. The remaining parts of the assembly include the partition 60, the adjuster mechanism 62 for moving the partition, the counting ring 16 and the split ring 66 for holding everything assembled on the canister. Thus, the measuring dispenser is achieved with very few parts. Only six parts—a drum 34, a partition 60, a three-part adjuster mechanism 62, and a rotatable knob 56—are required for the dispenser itself.

Moreover, with my unique indexing dispenser, it can be appreciated that relatively little surface area is moved with respect to each other to achieve a dispenser which is relatively free from clogging by material entering spaces between moving parts. Only the edge surfaces of the plate 102 move with respect to the inner cylindrical wall of the drum 34 and only the edge surfaces of the diametrical slot 76 move with respect to the side surfaces of plate 102. The only interengaging cylindrical surfaces are those that are provided between the cylindrical surfaces of the transverse partition 78 and the inside surfaces of the drum 34 in the vicinity of the partition. However, the transverse partition 78 has very limited cylindrical surface area and it is located at the forward end of the drum 34 between the forward end portion and the enlarged dispenser openings 70 and 72. Thus, there is little opportunity for dry ground coffee or other material to become wedged between the cylindrical surfaces of the transverse partition 78 and the inside wall of the drum 34.

What I claim is:

1. A measuring dispenser comprising:
   a. a canister having bottom wall means;
   b. a first curved guide positioned at said bottom wall means;
   c. a second curved guide positioned at said bottom wall means in line with the first curved guide;
   d. an enlarged opening provided in the bottom wall means of said canister between the first and second curved guides;
   e. a rotatable dispensing drum having a transverse wall and an enclosing side wall, said dispensing drum being positioned for rotational movement within said curved guides;
   f. an enlarged dispensing aperture formed in the enclosing side wall of said drum for cooperation with the enlarged opening formed in said bottom wall means;
   g. a slot provided in the transverse wall of said dispensing drum;
   h. a partition for separating said drum into variable measuring chambers, the partition including a generally longitudinal member having a width slightly less than the inside diameter of said drum and a transverse wall formed at one end of said partition, said partition being inserted within said drum with the longitudinal member extending through the slot in the transverse wall of the drum and the transverse partition wall being positioned within the other end of said drum whereby variable measuring chambers are formed between the transverse wall of the drum, the longitudinal partition member and the transverse partition wall; and
   i. means for moving the partition including the longitudinal member and the transverse partition wall in order to move the transverse partition wall toward and away from the transverse wall of the dispensing drum whereby to vary the volume of the measuring chambers that are provided between the transverse walls and the longitudinal member, the longitudinal partition member being slidable in the slot of the transverse wall of the drum as the transverse partition wall is being moved.

2. A measuring dispenser as defined in claim 1 wherein the means for moving the transverse partition wall toward and away from the transverse wall of the drum comprises:
   a. a rotational adjuster mechanism coupled to the partition; and
   said adjuster mechanism including means extending outwardly from said canister for permitting manual movement thereof in order to longitudinally move said transverse partition wall toward and away from the transverse wall of said drum in order to vary to volume of the dispensing chambers formed by said drum and said partition.

3. A measuring dispenser as defined in claim 2 wherein a rotatable knob is provided for rotating said dispensing drum and said adjuster mechanism extends through the inside of said rotatable knob.

4. A measuring dispenser as defined in claim 1 wherein the means for moving the transverse partition wall toward and away from the transverse wall of the drum comprises:
   a. a rotational adjuster mechanism including an adjuster member having an inclined driver formed on its outer periphery, said member being coupled to the partition;
   b. an adapter member being provided with a central axial opening having means formed therein for cooperating with the inclined driver formed on the outer periphery of the adjuster; and
   c. means coupled to said adjuster member extending outwardly from said canister for permitting manual rotation thereof in order to longitudinally move said transverse partition wall toward and away from the transverse wall of said drum in order to vary the volume of the dispensing chambers formed by said drum and said partition.

5. A measuring dispenser as defined in claim 1 wherein means is provided for rotating said drum for dispensing a quantity of material comprising:
   a. a plurality of driving slots integrally formed in an end portion of the generally cylindrical drum; and b. a generally cylindrical rotatable knob, one end portion of said knob including a plurality of radially outwardly extending drive lugs integrally formed therewith for insertion within the drive slots that are formed in said end portion of the dispensing drum, and the other end portion of said generally cylindrical knob extending outwardly from the canister so that it may be manually grasped and rotated by an operator to rotate the drum in order to dispense a measured quantity of material.

6. A measuring dispenser as defined in claim 5 wherein the drive lugs that are integrally formed at one end of said knob are flexible pawls and each of said flexible pawls is integrally formed with said rotatable knob to include an elongated portion of partial cylindrical shape which is integrally connected at one of its ends to the knob and wherein its free end includes a surface which is substantially radial to the cylindrical knob so that when said knob is rotated in one direction the substantially radial surfaces of said drive lugs will be moved into engagement with the drive slots that are formed in the dispensing drum and when said knob is rotated in the opposite direction the elongated pawls will slide on the surfaces of said dispensing drum adjacent to said drive slots without rotating the drum whereby the dispensing drum will only be rotated when the knob is turned in one direction.

7. A measuring dispenser as defined in claim 5 wherein the means for moving the partition wall toward and away from the transverse wall of the dispensing drum extends axially through said knob and terminates in a manually grippable means which is positioned radially inside of said knob and may be manually gripped and rotated within the knob to move the partition to vary the size of the dispenser chambers within said dispensing drum.

8. A measuring dispenser as defined in claim 1 wherein:
 a. a rotatable knob is provided for rotating said dispensing drum;
 b. a circular knob guide is located on the front wall of the canister and is positioned in line with the first and second curved guides for rotatably supporting said knob on said canister;
 c. said knob being generally cylindrical in shape and including a radially outwardly extending flange;
 d. a counting ring having an inside diameter which is larger than the diameter of said cylindrical knob but smaller than the diameter of said flange positioned over said cylindrical knob and sandwiched between the flange of the knob and the circular knob guide; and
 e. indicia provided on an outer surface of said counting ring so that as the knob is rotated an observer may be provided with an indication of the number of times that a measured quantity of material has been dispensed by the dispensing drum.

9. A measuring dispenser as defined in claim 8 wherein a means is provided for holding the counting ring on said knob in any one of a plurality of positions comprising:
 a. a plurality of radially extending notches integrally formed on an inner surface of said counting ring; and
 b. a pawl finger integrally formed on the cylindrical surface of said knob extending toward said notches whereby when said ring is rotated in one direction with respect to said knob the ring will slide on the knob without moving the knob and when the knob is rotated in said one direction with respect to the ring the pawl will engage the next succeeding notch to rotate the counting ring as the knob is rotated.

10. A measuring dispenser comprising:
 a. a canister having a generally vertical wall and bottom wall means;
 b. a circular guide positioned on the generally vertical wall of the canister;
 c. an opening provided in the bottom wall means of the canister;
 d. a rotatable dispensing drum positioned adjacent to the opening provided in the bottom wall of the canister;
 e. a dispensing chamber provided within said dispensing drum;
 f. a dispensing aperture provided in said dispensing drum;
 g. a knob for rotating the drum in order to dispense material through the aperture in the dispensing drum, said knob including drive means; and
 h. a counting ring positioned between the knob of the dispensing drum and the circular guide, said counting ring including driven means that is engaged by the drive means that is provided on said knob for incrementally rotating said counting ring to indicate the number of volumes that have been dispensed from the dispensing chamber that is provided in the dispensing drum.

11. A measuring dispenser as defined in claim 10 wherein said knob is generally cylindrical in shape and includes a radially outwardly extending flange, said counting ring having an inside diameter which is larger than the diameter of said cylindrical knob but smaller than the diameter of said flange and is positioned over said cylindrical knob and sandwiched between the flange on the knob and the circular guide.

12. A measuring dispenser as defined in claim 10 wherein indicia are provided on an outer surface of said counting ring so that as the knob is rotated an observer may be provided with an indication of the number of times that a measured quantity of material has been dispensed by the drum.

13. A measuring dispenser as defined in claim 10 wherein a plurality of radially extending notches are integrally formed on an inner surface of the counting ring and a plurality of pawl fingers are integrally formed with said knob so that when the ring is rotated in one direction the pawls of the knob will engage one of the notches in the counting ring to rotate the counting ring as the knob is rotated.

14. A measuring dispenser as defined in claim 10 wherein the circular guide is provided with cam surfaces for holding the drive means on the knob out of engagement with the driven means on the counting ring for preventing rotation of the counting ring during a portion of the rotation of said knob in order to incrementally rotate the counting ring to indicate the number of volumes that have been dispensed from the dispensing chamber that is provided in the dispensing drum.

15. A measuring dispenser comprising:
 a. a canister having a front wall, a rear wall and bottom wall means;
 b. a front guide having a curved opening positioned at said bottom wall means;

c. a rear guide having a curved opening positioned at said bottom wall means in line with the curved opening formed in the front guide;
d. an enlarged opening provided in the bottom wall means of said canister between the front and rear guides;
e. a generally cylindrical dispensing drum having a transverse wall integrally formed with a generally cylindrical side wall, said dispensing drum being positioned for rotational movement within said front and rear guides;
f. a fist enlarged dispensing aperture formed in the cylindrical wall of said drum for cooperation with the enlarged opening formed in said bottom wall means;
g. a second enlarged dispensing aperture formed in the cylindrical wall of said drum diametrically opposite to the first enlarged aperture;
h. a diametrical slot provided in the transverse wall of said dispensing drum;
i. a partition for separating said drum into two variable measuring chambers, the partition including a generally longitudinal flat plate having a width slightly less than the inside diameter of said generally cylindrical drum and a transverse wall integrally formed at one end of said partition arranged generally perpendicular to said longitudinal plate and having a diameter slightly less than the inside diameter of said drum, said partition being inserted within said drum with the longitudinal plate extending through the slot in the transverse wall of the drum and the transverse partition wall being positioned within the other end of said drum whereby two variable measuring chambers are formed between the transverse wall of the drum, the longitudinal flat plate and the transverse partition wall; and
j. means for moving the partition including the longitudinal flat plate and the transverse partition wall in order to move the transverse partition wall toward and away from the transverse wall of the dispensing drum whereby to vary the volume of the two measuring chambers that are provided between the transverse walls and the longitudinal flat plate, the longitudinal flat plate being slidable in the slot of the transverse wall of the drum as the transverse partition wall is being moved.

* * * * *